United States Patent
Smith et al.

(10) Patent No.: US 12,056,062 B2
(45) Date of Patent: Aug. 6, 2024

(54) APPARATUS AND METHOD FOR CAPABILITY-BASED PROCESSING

(71) Applicant: ARM LIMITED, Cambridge (GB)

(72) Inventors: Bradley John Smith, Suffolk (GB); Thomas Christopher Grocutt, Cambridgeshire (GB); François Christopher Jacques Botman, Cambridgeshire (GB)

(73) Assignee: Arm Limited, Cambridge (GB)

( * ) Notice: Subject to any disclaimer, the term of this patent is extended or adjusted under 35 U.S.C. 154(b) by 53 days.

(21) Appl. No.: 17/759,973

(22) PCT Filed: Dec. 2, 2020

(86) PCT No.: PCT/GB2020/053093
§ 371 (c)(1),
(2) Date: Aug. 2, 2022

(87) PCT Pub. No.: WO2021/156589
PCT Pub. Date: Aug. 12, 2021

(65) Prior Publication Data
US 2023/0060666 A1    Mar. 2, 2023

(30) Foreign Application Priority Data
Feb. 7, 2020  (GB) .................................. 2001688

(51) Int. Cl.
*G06F 12/14*   (2006.01)
*G06F 9/30*    (2018.01)
*G06F 9/35*    (2018.01)

(52) U.S. Cl.
CPC ........ *G06F 12/1458* (2013.01); *G06F 9/3005* (2013.01); *G06F 9/35* (2013.01)

(58) Field of Classification Search
CPC .. G06F 12/1027; G06F 12/1458; G06F 21/52; G06F 9/3005; G06F 9/30105;
(Continued)

(56) References Cited

U.S. PATENT DOCUMENTS

2018/0225120 A1* 8/2018 Barnes ................ G06F 9/30101

OTHER PUBLICATIONS

Woodruff Jonathan et al., "CHERI Concentrate: Practical Compressed Capabilities", IEEE Transactions on Computers, IEEE, USA, vol. 68, No. 10, Oct. 1, 2019 (Oct. 10, 2019), pp. 1455-1469, XP011744525, ISSN: 0018-9340, DOI: 10.1109/TC.2019.2914037 [retrieved on Sep. 6, 2019] the whole document.
(Continued)

*Primary Examiner* — Yong J Choe
(74) *Attorney, Agent, or Firm* — NIXON & VANDERHYE P.C.

(57) ABSTRACT

Apparatus comprises a processor to execute program instructions stored at respective memory addresses, processing of the program instructions being constrained by a prevailing capability defining at least access permissions to a set of one or more memory addresses; the processor comprising: control flow change handling circuitry to perform a control flow change operation, the control flow change operation defining a control flow change target address indicating the address of a program instruction for execution after the control flow change operation; and capability generating circuitry to determine, in dependence on the control flow change target address, an address at which capability access permissions data is stored; the capability generating circuitry being configured to retrieve the capability access permissions data and to generate a capability for use as a next prevailing capability in dependence upon at least the capability access permissions data.

19 Claims, 10 Drawing Sheets

(58) Field of Classification Search
CPC .......... G06F 9/321; G06F 9/322; G06F 9/327; G06F 9/35
See application file for complete search history.

(56) References Cited

OTHER PUBLICATIONS

Robert Bedichek, "Some Efficient Architecture Simulation Techniques", Department of Computer Science, FR-35 University of Washington, Seattle, Washington 98195, 1990.
Woodruff, et al., "CHERI Concentrate: Practical Compressed Capabilities", 2019.

* cited by examiner

A) SET   PR1. pointer = 140000 ⟶ trigger error

B) SET   PR1. pointer = 140000

LD   R5,   PR1         ⟶ trigger error

| Capability fields | |
|---|---|
| Tag | Hardware managed enforcement of capability properties |
| Permissions | Individual permissions to perform operations |
| Bounds | A range of virtual or physical addresses over which memory capabilities may permit access to memory, or A range of object types that may be used by sealing operations |
| Address | The address in address based capabilities |
| Object type | The object type in sealed and sealing capabilities |
| Seal | A Sub-format indicating whether a capability is encapsulated |

FIG. 4

APPARATUS AND METHOD FOR CAPABILITY-BASED PROCESSING

NOTICE

This invention was made with Government support under Contract Number HR001118C0016 awarded by the Defense Advanced Research Projects Agency (DARPA). The Government has certain rights in this invention.

BACKGROUND

This disclosure relates to apparatus and methods.

Some examples of data processing apparatus handle processes in which memory access is determined by so-called capability data. In some examples, pointers are augmented with metadata to represent specific access restrictions and/or permissions.

Examples of such arrangements are discussed in the paper "CHERI: A Hybrid Capability-System Architecture for Scalable Software Compartmentalization", 2015 IEEE Symposium on Security and Privacy, 17-21 May 2015, ISBN 978-1-4673-6949-7, the contents of which are incorporated herein by reference.

In the case of a control flow change (such as a branch, though other examples such as the handling of exceptions are also applicable) from a first code portion to a second code portion, in order to make efficient use of the security features offered by the capabilities, a first capability applicable to execution of the first code portion should allow access to the first code portion, so that there is a need to make a change to a second capability (allowing access to the second code portion) in order to implement the control flow change.

One way of achieving this would be store, for example as literal data in the first code portion, data for use to define the second capability. This then requires at least two operations to implement the control flow change: an operation to load the data and to apply it as a new capability; and an operation to implement the control flow change itself.

SUMMARY

In an example arrangement there is provided apparatus comprising:
a processor to execute program instructions stored at respective memory addresses, processing of the program instructions being constrained by a prevailing capability defining at least access permissions to a set of one or more memory addresses; the processor comprising:
control flow change handling circuitry to perform a control flow change operation, the control flow change operation defining a control flow change target address indicating the address of a program instruction for execution after the control flow change operation; and
capability generating circuitry to determine, in dependence on the control flow change target address, an address at which capability access permissions data is stored;
the capability generating circuitry being configured to retrieve the capability access permissions data and to generate a capability for use as a next prevailing capability in dependence upon at least the capability access permissions data.

In another example arrangement there is provided a method comprising:
executing program instructions stored at respective memory addresses, processing of the program instructions being constrained by a prevailing capability defining at least access permissions to a set of one or more memory addresses;
performing a control flow change operation, the control flow change operation defining a control flow change target address indicating the address of a program instruction for execution after the control flow change operation;
determining, in dependence on the control flow change target address, an address at which capability access permissions data is stored;
retrieving the capability access permissions data; and
generating, a capability for use as a next prevailing capability in dependence upon at least the capability access permissions data.

In another example arrangement there is provided a computer program for controlling a host data processing apparatus to provide an instruction execution environment comprising:
processor logic to execute program instructions stored at respective memory addresses, processing of the program instructions being constrained by a prevailing capability defining at least access permissions to a set of one or more memory addresses; the processor logic comprising:
control flow change handling logic to perform a control flow change operation, the control flow change operation defining a control flow change target address indicating the address of a program instruction for execution after the control flow change operation; and
capability generating logic to determine, in dependence on the control flow change target address, an address at which capability access permissions data is stored;
the capability generating logic being configured to retrieve the capability access permissions data and to generate a capability for use as a next prevailing capability in dependence upon at least the capability access permissions data.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 4 schematically represents a set of capability fields;

DESCRIPTION OF EMBODIMENTS

Figure 1:
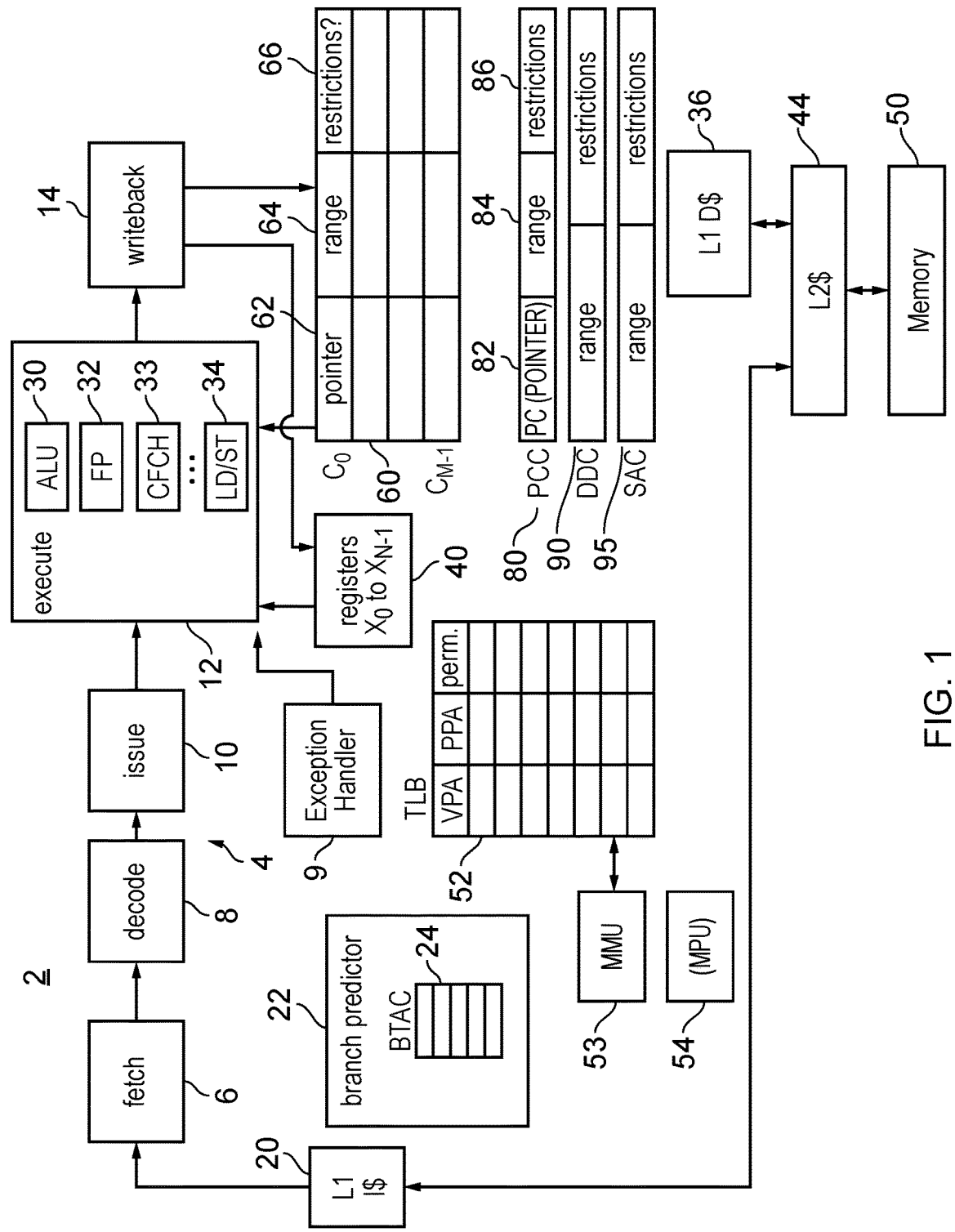
FIG. 1 schematically illustrates a data processing apparatus.

Before discussing the embodiments with reference to the accompanying figures, the following description of embodiments is provided.

An example embodiment provides apparatus comprising:
a processor to execute program instructions stored at respective memory addresses, processing of the program instructions being constrained by a prevailing capability defining at least access permissions to a set of one or more memory addresses; the processor comprising:
control flow change handling circuitry to perform a control flow change operation, the control flow change operation defining a control flow change target address indicating the address of a program instruction for execution after the control flow change operation; and
capability generating circuitry to determine, in dependence on the control flow change target address, an address at which capability access permissions data is stored;
the capability generating circuitry being configured to retrieve the capability access permissions data and to generate a capability for use as a next prevailing capability in dependence upon at least the capability access permissions data.

In example arrangements, instead of providing capability information at the calling code portion for a control flow change, suitable capability information to allow a capability to be constructed or generated for use as a capability configured to constrain processing of one or more instructions for execution after the control flow change operation) is provided at an address defined with respect to the control flow change target address. This advantageously allows the capability data to be stored only once and can provide for a more efficient change of capability at a control flow change.

In some (but not all) examples, the control flow change target address might indicate the address of a next program instruction for execution after the control flow change operation. In other examples, one or more so-called branch delay slots may be used, such that a branch does not necessarily take immediate effect. In some such examples the instruction that is executed next after a branch instruction is just the instruction after the branch in the memory, and not necessarily the instruction at the target address of the branch. In the case where a single branch delay slot is used, control would move to the branch target address after the instruction after the branch in memory.

In some examples, only part of the new capability needs to be stored with respect to the target address. For example, in situations in which each capability comprises at least a pointer and data defining access permissions to the set of memory addresses, the capability generating circuitry may be configured to generate the pointer in dependence upon the control flow change target address and to generate the data defining access permissions to the set of memory addresses in dependence upon the capability access permissions data. In other examples, the whole of a capability may be stored with respect to the target address.

In examples, the capability access permissions data defines one or more of (i) a lower limit memory address of an address region comprising the one or more memory addresses to which access is permitted, (ii) an upper limit memory address of the address region and (iii) a set of permission attributes applicable to the address region. In other examples the capability access permissions data defines a location at which information defining access permissions to the set of memory addresses is stored.

In some examples, the execution of (at least) the first instruction following the flow change can be performed in parallel with (or at least overlapping) the generation of the new capability. In such situations, in response to the control flow change operation the processor may be configured to set a status indicator, to indicate that the capability generating circuitry is required to generate the capability for use as the next prevailing capability. In response to the status indicator being set, the processor may be configured to fetch and/or execute at least the first instruction at the control flow change target address independently of constraint by a prevailing capability.

The status indicator may be cleared once the new capability is ready, in which case the processor may be configured, in response to generation of the capability for use as the next prevailing capability, to clear the status indicator to a state indicating that processing of program instructions is constrained by a prevailing capability. To allow this status to be maintained and recovered in the case of an intervening exception, in some examples the processor is configured, in response to a processing exception event to store the status indicator for retrieval upon processing of an exception return event.

In other examples, the generation of the new capability may be completed before it is needed for execution of the first instruction in which case the one or more instructions for execution after the control flow change operation include at least an instruction at the control flow change target address.

In some examples, the first instruction can be at the target address, in which case the control flow change handling circuitry is configured to determine the address at which capability access permissions data is stored as a memory address preceding the control flow change target address.

In some examples, the control flow change operation is a branch operation in response to execution of a branch instruction, which may comprise an operation code which defines at least the control flow change target address by encoding within the operation code a value indicative of a difference from an instruction address of the branch instruction. In other examples the operation code may define at least a register identifier that identifies a register containing a value indicative of the control flow change target address.

In other examples, the control flow change operation may be a branch and link operation in response to execution of a branch and link instruction, in which case the branch and link operation may store a return address capability, the return address capability being generated in dependence on the instruction address of the branch and link instruction and the prevailing capability in use when the branch and link instruction was executed.

In other examples, as an alternative to (or in addition to) branch operations, the control flow change operation may define a change of control flow to a processing exception handling routine. In such cases the processor may be configured to identify an entry in a vector table in memory in dependence on a number associated with the exception handling routine to be processed, wherein at least part of the entry is indicative of the control flow change target address, and at least part of the entry may be indicative of whether the exception handling routine is to be processed independently of constraint by a prevailing capability (for example, the vector table could indicate just the target address, and the question of whether the exception handler uses capabilities could be determined elsewhere; for example it may always use capabilities, or there may be a single configuration bit that controls how all exceptions are handled). A further example of a control flow change operation comprises an exception return operation to return from processing such an exception handling routine.

Another example embodiment provides a method comprising:
  executing program instructions stored at respective memory addresses, processing of the program instructions being constrained by a prevailing capability defining at least access permissions to a set of one or more memory addresses;
  performing a control flow change operation, the control flow change operation defining a control flow change target address indicating the address of a program instruction for execution after the control flow change operation;
  determining, in dependence on the control flow change target address, an address at which capability access permissions data is stored;
  retrieving the capability access permissions data; and
  generating a capability for use as a next prevailing capability in dependence upon at least the capability access permissions data.

Another example embodiment provides a computer program for controlling a host data processing apparatus to provide an instruction execution environment comprising:
  processor logic to execute program instructions stored at respective memory addresses, processing of the program instructions being constrained by a prevailing capability defining at least access permissions to a set of one or more memory addresses; the processor logic comprising:
    control flow change handling logic to perform a control flow change operation, the control flow change operation defining a control flow change target address indicating the address of a program instruction for execution after the control flow change operation; and
    capability generating logic to determine, in dependence on the control flow change target address, an address at which capability access permissions data is stored;
    the capability generating logic being configured to retrieve the capability access permissions data and to generate a capability for use as a next prevailing capability in dependence upon at least the capability access permissions data.

Overview of Apparatus

Referring now to the drawings, FIG. 1 schematically illustrates an example of a data processing apparatus or processor 2 comprising a processing pipeline 4 for processing instructions. In this example the processing pipeline 4 includes a number of pipeline stages including a fetch stage 6, a decode stage 8, an issue stage 10, an execute stage or processing element 12, and a write back stage 14, but it will be appreciated that other types or combinations of stages may be provided. For example a rename stage for performing register renaming could be included in some implementations. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted to be taken, or from the next sequential address if the branch is predicted not to be taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions. It will be appreciated that features like the instruction cache 20 and branch predictor 22, may not be present in other embodiments (such as lower performance embodiments where circuit area is important).

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some implementations may support in-order processing so that instructions are issued for execution in an order corresponding to the program order in which instructions were fetched from the L1 instruction cache 20. Other implementations may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first. It will be appreciated that in other embodiments the issue stage 10 may be combined with other stages, or eliminated altogether, at the cost of performance.

The issue stage 10 issues the instructions to the execute stage 12 where the instructions are executed to carry out various data processing operations. For example the execute stage may include a number of execute units 30, 32, 33, 34 including an arithmetic/logic unit (ALU) 30 for carrying out arithmetic or logical operations on integer values, a floating-point (FP) unit 32 for carrying out operations on values represented in floating-point form, a control flow change handling unit or circuitry 33 to perform a control flow change operation (in one example this unit embodies the function of a branch instruction execution unit to determine the actual outcome of the branch operation), and a load/store unit 34 for carrying out load operations for loading a data value from a level 1 (L1) data cache 36 to a register within a set of general purpose data registers 40 or store operations for storing a data value from a register within the set of general purpose data registers 40 to the L1 data cache 36. It will be appreciated that these are just some examples of the types of execute units which could be provided, and many other kinds could also be provided. In other embodiments the level 1 data cache 36 may not be present and the load/store unit 34 may access memory directly. For carrying out the processing operations, the execute stage 12 may read data values from a set of registers 40. Results of the executed instructions may then be written back to the registers 40 by the write back stage 14.

Exception handling circuitry 9 will be discussed further below.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy and/or memory 50, may be physically addressed. Hence, a translation lookaside buffer 52 (TLB) may be provided, under the control of a memory management unit (MMU) 53 for translating the virtual addresses used by the pipeline 4 into physical addresses used for accessing the cache or memory. For example, the TLB 52 may include a number of entries each specifying a virtual page address ("VPA") of a corresponding page of the virtual address space and a corresponding physical page address ("PPA") to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information ("perm") specifying access permissions such as indicating whether certain pages of addresses are accessible in certain modes of the pipeline 4. In some implementations, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4. In other embodiments the MMU 53 and TLB 52 may not exist and the instructions executed by the data processing apparatus 2 may directly access physical addresses. In such embodiments access permissions and cache policy information may instead be provided by a memory protection unit (MPU) 54 that contains registers that specify the information relating to a range of addresses in physical memory.

While FIG. 1 shows a single level TLB 52, it will be appreciated that a hierarchy of translation may be provided by the MMU 53 and/or that multiple TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. Alternatively, a so-called intermediate physical address (IPA) may be used so that a first translation is from a virtual address to the IPA, and a second level of translation is from the IPA to a physical address. In this way, multiple levels of address translation can be used so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

In FIG. 1, a single stage and level of TLB 52 is shown, for clarity of the diagram.

If a required entry for a page to be accessed is not in any of the TLBs then a page table walk can be performed by the MMU 53 to access so-called page tables in the memory 50. Any known TLB management scheme can be used in the present technique.

In some examples, the execute stage 12 can be implemented by a multi-threaded processing element to execute one or more processing threads.

As shown in FIG. 1, the apparatus 2 may have a set of bounded pointer registers 60. Whilst the set of bounded pointer registers is shown in FIG. 1 as being physically separate to the set of general purpose data registers 40, in one implementation the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to as permissions information) which may define one or more restrictions/permissions on the use of the pointer. A validity tag (for example a $65^{th}$ bit in the case of a 64 bit bounded pointer register, or a $129^{th}$ bit in the case of a 128 bit bounded pointer) can be used to indicate whether (a) a valid bounded pointer is stored and (b) the range and permission metadata are valid. The tag is able to be set only by hardware in response to a proper capability-setting instruction, and in at least some example is automatically unset in response to any attempt to write illegally to a valid capability.

For example the restriction 66 could be used to restrict the types of instructions which may use the pointer 62, or the modes of the pipeline 4 in which the pointer can be used. Hence, the range information 64 and restriction information 66 may be considered to define capabilities $C_0$-$C_{M-1}$ within which the respective pointers 62 are allowed to be used. When an attempt is made to use a pointer 62 outside the defined capabilities, an error can be triggered.

The range information 64 can be useful for example for ensuring that pointers remain within certain known bounds and do not stray to other areas of the memory address space which might contain sensitive or secure information. In an implementation where the same physical storage is used for both general purpose data registers and bounded pointer registers, then in one implementation the pointer value 62 may for example be stored within the same storage location as used for a corresponding general purpose register.

Figure 2:
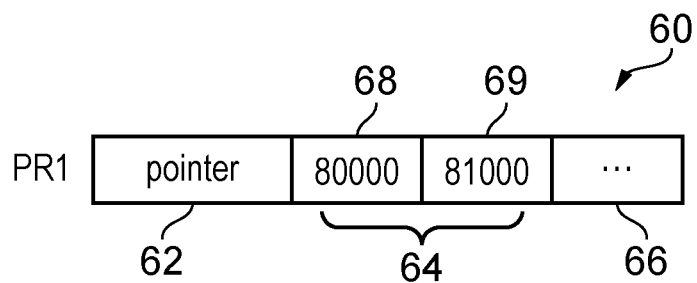
FIG. 2 schematically illustrates a bounded pointer.

FIG. 2 shows an example of types of instructions for which the allowable range is used to protect against unauthorised access to data or instructions. As shown in the upper part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range. It will be appreciated that the bounds can be represented in a variety of different formats. For example the upper and lower bounds could be expressed with respect to the pointer value and/or in a floating point representation. Such formats may enable the size of the bounds information to be reduced with respect to a "raw" size of upper and lower limit address information, or in other words the bounds information may be expressed more efficiently (using fewer bits) while still defining upper and lower limit addresses.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways and the manner by way it is set is an implementation detail and the present techniques do not depend on the specific method used. Purely as examples, privileged instructions, user-space code, secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 2. Any known technique for setting or modifying the range information 64 could be used.

In addition to the set of bounded pointer storage elements 60 that may be used at the execute stage 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60. FIG. 1 also schematically illustrates a Default Data Capability (DDC) register 90 and a System Access Capability (SAC) register 95, both to be discussed below. It will be appreciated that in some embodiments all data accesses may be directly constrained by capabilities stored in the bounded pointer storage elements 60, and thus there may be no need for a Default Data Capability register 60. Similarly the System Access Capability register 65 is not essential to this disclosure and may not be present in some embodiments.

Figure 3:
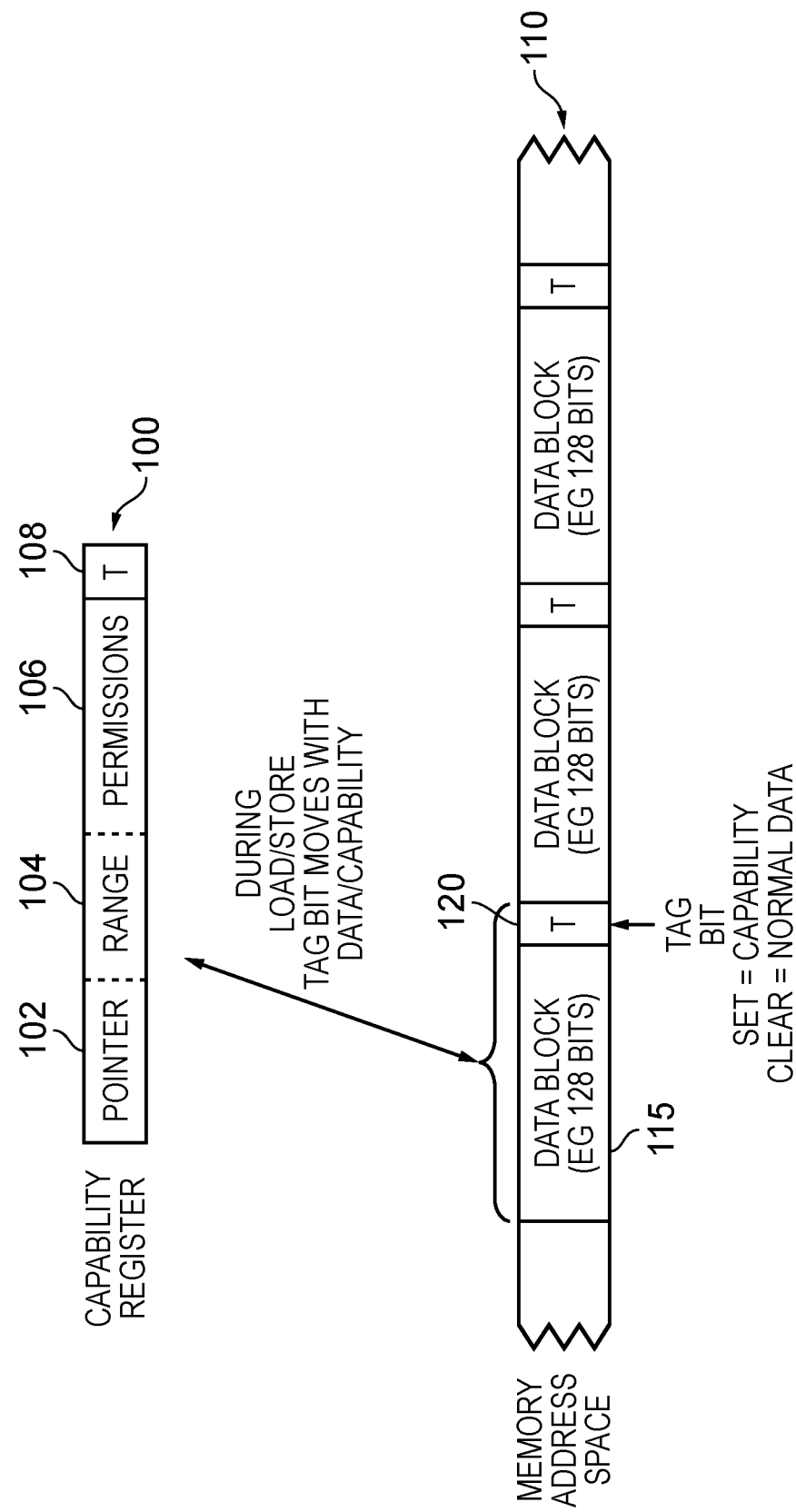
FIG. 3 schematically illustrates the use of a capability register.

FIG. 3 schematically illustrates how a tag bit of the type mentioned above is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a valid capability, and is cleared to indicate that the associated data block represents normal data, and hence cannot be treated as a capability. It will be appreciated that the actual value associated with the set or the clear state can vary dependent on implementation, but purely by way of illustration, in one example implementation if the tag bit has a value of 1, it indicates that the associated data block is a capability, and if it has a value of 0 it indicates that the associated data block contains normal data.

When a capability is loaded into one of the bounded pointer registers 60 (also referred to as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

Capabilities

Capabilities will now be discussed in more detail.

Although higher level applications can be arranged to run in "safe" constrained execution environments such as JAVA and JavaScript, lower layers of a system must generally provide the link to actual execution on hardware. As a result, almost all such layers are currently written in the C/C++ programming languages typically consisting of tens of millions of lines of trusted (but not trustworthy) code.

It is an aim to provide an underlying architectures to offer stronger inherent immunity to malicious attacks. Capabilities can provide one part of such a strategy.

The Capability data type represents a delegable token of authority to access one or more architecturally defined resources. Capabilities fall broadly into three types:

1) memory capabilities used to permit access to ranges of memory for data transfer and instruction fetch
2) system access capabilities used to permit access to certain system operations
3) sealing capabilities used to encapsulate other capabilities with an object type Each capability contains a number of logical fields, some of which are only present in certain capability types. Examples of such fields are shown schematically in FIG. 4.

Capability registers are used to hold capabilities and define extensions to the memory system so that capability properties are enforced when a capability is held in general purpose memory. Instructions can be provided to load and store capabilities from memory, use capability registers to access data and capabilities in memory, to branch using a capability and to manipulate capabilities held in capability registers without forging new rights.

Restrictions due to the use of capabilities are over and above those enforced by existing MMU or MPU and Exception Level based restrictions. Use of capabilities can be arranged not to weaken the protection already offered by those mechanisms.

Ambient Capabilities

One or more (for example, three) ambient capability registers may be provided defining ambient capabilities. Using these facilities, ambient effects of the capability extension can be enabled and disabled at each exception level. Enabling ambient effects at an exception level enables the effects of ambient capability registers, modifies the behaviour of exception entry and return to the level and modifies the behaviour of several existing instructions which naturally operate on addresses. In some examples, three ambient capability registers are provided:

(a) Program Counter Capability (PCC) Register

This restricts the use of instruction fetches. The PCC bounds and permissions may be updated using capability branch and return instructions and on exception entry and return.

(b) Default Data Capability (DDC) Register

The PCC affects data accesses relative to the program counter. Other data accesses are restricted either by the implicit use of a default data capability or by the explicit use of a capability as a base register.

(c) System Access Capability (SAC) Register

Access to system registers and system operations can be restricted by permissions held in the SAC register.

Control Flow Change Operations

Figure 5:
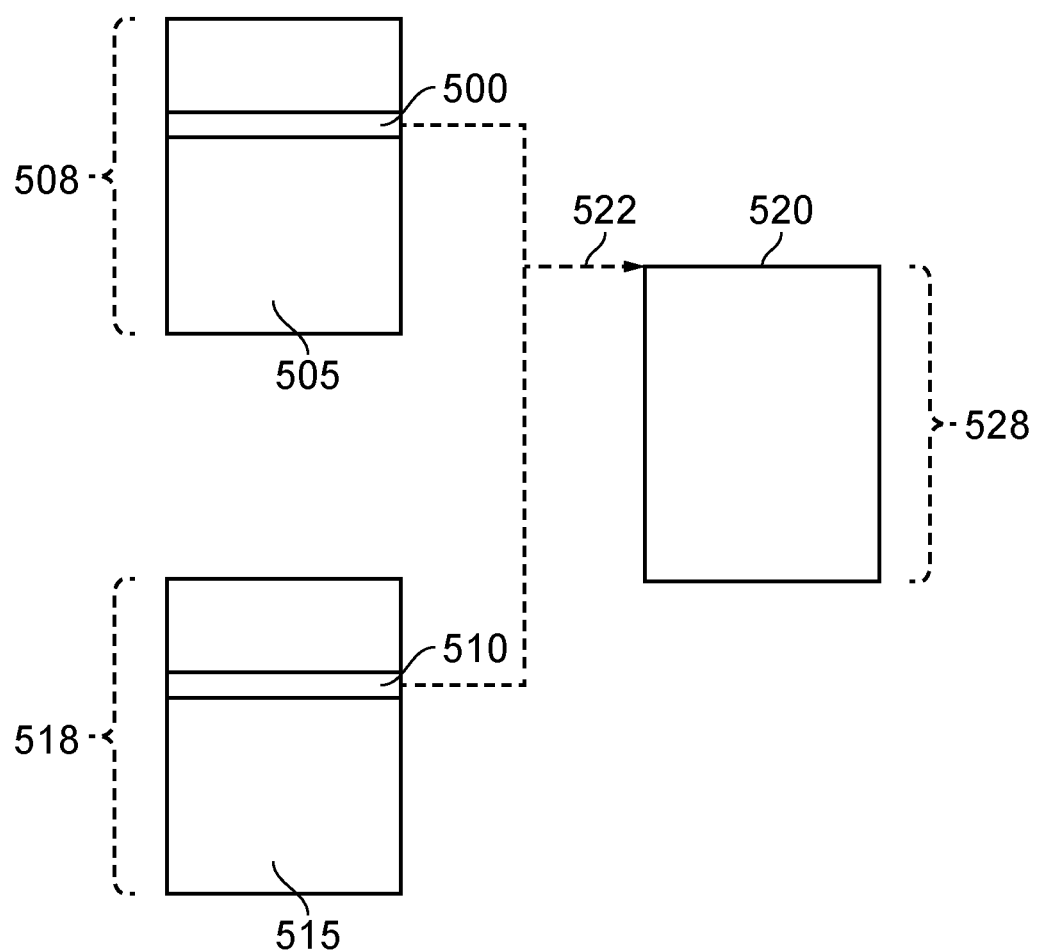
FIG. 5 schematically illustrates a control flow change operation.

FIG. 5 schematically illustrates an example of a control flow change operation.

In this first example, the control flow change operation is a branch operation (in response to execution of a branch instruction) in which a branch instruction 500, 510 causes a change in program flow from a respective first (or "calling") code portion 505, 515 to a control flow change target address 522 indicating the start of (or other predetermined location within) a target or "callee" code portion 520.

In some examples, the branch instruction may comprise an operation code which defines at least the control flow change target address by a value indicative of a difference from an instruction address of the branch instruction. In other examples, the branch instruction may comprise an operation code which defines at least a register identifier that identifies a register containing a value indicative of the control flow change target address.

In some examples, once the code portion 520 has been executed, control may return to the calling or originating code portion (505, 515 as the case may be). This latter feature may be implemented in some examples by using a so-called branch-with-link operation in which a return address to the originating code (in fact to the next instruction address after the branch instruction in some embodiments) is retained, for example as part of the control flow change operation the return address may be stored on a stack data structure or in a link register within the set of general purpose data registers 40. In some embodiments the return address may be a return address capability which contains in addition to the return address, contains capability to use as the prevailing capability upon to the originating code. The return capability may be derived from the prevailing capability in use at the point the branch-with-link operation was performed.

In the example of FIG. 5, two possible initial code portions 505, 515 are shown. In fact, any number of branch instructions may cause a redirection to the code portion 520; a reason for showing two of them in FIG. 5 is simply to illustrate that there may be multiple instances of a branch instruction with a common target or destination.

Execution of the code portion 505 is performed in accordance with a prevailing first capability giving access permission, for the processing of program instructions, to a first range 508 of memory addresses, for example encompassing the whole of the code portion 505. Similarly, the code portion 515 is processed under constraints defined by a capability giving access to memory addresses 518. However, in order to execute the program instructions of the code portion 520, that is to say, instructions to be executed after the control flow change operation, a different capability 528 (as a new or next prevailing capability) giving access permission to memory addresses containing the code portion 520, is required.

A previously proposed technique for achieving this was to execute instructions associated with the branch instruction 500, 510 to load data stored within the calling code portion 505, 515 into a respective capability register. Such data may be stored as so-called literal data, for example at the end (the lower portion as drawn) of the respective code portion. However, this can require additional instructions and also requires storage space at each possible instance of a calling function. Such a technique can also create a performance bottleneck as the capability must be loaded before the target address of the branch can be determined. This can in turn, slow down execution of the instructions at the target code portion 520. Another example of a control flow change operation is taking an exception. An existing technique for determining the target address of an exception entry control flow change operation is to have a table of addresses that is indexed by the number of the exception being entered. To enable indexing into such a table, such systems typically require that all entries within the table are the same size. In a processor 2 that supports the use of capability exception handlers this in turn can mean that every entry in the table must be large enough to store a capability, even if the majority of the exception handlers do not use capabilities.

The wasted space that this represents can be important on small embedded processors which typically have very small amounts of memory or on systems with large numbers of exception handlers.

In example arrangements to be discussed below, rather than storing a respective individual copy at each potential calling code portion, a determination is made, in dependence on the control flow change target address, an address at which capability access permissions data is stored; the capability access permissions data is retrieved and a capability for use as a next prevailing capability is generated in dependence upon at least the capability access permissions data. In embodiments the generated capability is installed or otherwise established as that next prevailing capability. In some examples, it takes effect from the first instruction of the callee code. In other examples, one or more first instructions of the callee code may be processed independently of a prevailing capability in the meantime.

The PCC as the Prevailing Capability

From an architectural point of view (to be discussed below) a control flow change operation may involve:

Getting the newly generated capability

Doing a branch to that capability so the PCC is set to that capability

Checking to see if the new PCC value allows the next instruction to be fetched, and only fetching it if allowed Therefore, in these examples, references to constraint by a prevailing capability relate to the setting of the PCC in response to capability data associated with execution of particular code portions.

Notes on Branch Prediction, Speculative Processing and/or Out of Order Processing In example embodiments, the capability is checked at instruction fetch to determine whether permission exists to access the address to be fetched. If not, then an exception or fault may be initiated.

In a hypothetical example involving a branch to an invalid capability that points to an undefined instruction, if the capability is checked before the instruction fetch occurs then an "invalid capability fault" would be expected, rather than (if however the PCC capability check occurred at execute time) an "undefined instruction fault".

However, in the example shown in FIG. 1, however, the branch predictor 22 oversees the fetching process such that an instruction relating to a branch target address (or indeed another control flow change target address) may be fetched at a stage (in time) before the branch is resolved.

In other examples, instructions may be executed out of order, again such that instructions may be physically fetched from addresses before capabilities relating to those addresses are in place. In other examples, pipelining, caching and other techniques may alter the physical manner in which instructions are processed, generally with the aim of improving efficiency of processing.

In order to reconcile these situations, a difference is noted between the actual physical circuitry providing processing of the instructions and the processor and instruction set architecture defining behaviour with respect to processing of the instructions.

An instruction set architecture can provide for processing of a common set of instructions by an in-order processor, an out-of-order processor, processors with and without speculative or predictive fetching or execution, processors with and without pipelines and the like. The final results and the overall machine outcome will be the same in each case; it is just that the efficiency of the internal processing may be different.

From an architecture point of view each instruction is executed completely before the next instruction is even fetched.

In the case of processors introducing some temporal overlap into the handling of instructions (for example, by pipelining, superscalar, and/or out of order execution) a role of such circuitry is to provide entirely equivalent results to those applicable to the architectural situation mentioned above.

Similarly, where speculative processing of any form is provided, the speculative state is maintained (which may include maintaining fault situations as speculative) for as long as is required to allow compliance with the architectural requirements.

For example, the microarchitecture or physical structure may maintain the illusion of operation in accordance with the architecture by keeping the results of faults in speculative state, then if the committed architecture state reaches a point where a speculative fault occurred then the fault moves from being a speculative fault to being an actual fault, and is actually taken. If on the other hand if another event causes a the architecture state to go in a different direction (for example in the case of a branch miss prediction) then the pending speculative fault is flushed as the event that caused the speculative fault should never have happened in the first place.

Therefore, it will be appreciated by the skilled person that established techniques like pipelining and speculative execution may be performed by one of ordinary skill in the art without departing from the scope of this disclosure.

Storage of Capability Access Permissions Data

Figure 6:
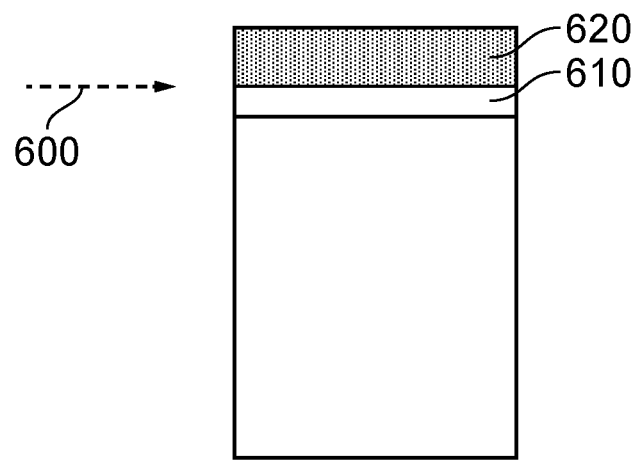
FIGS. 6 and 7 schematically illustrate options for storing capability access permissions data.
Figure 7:
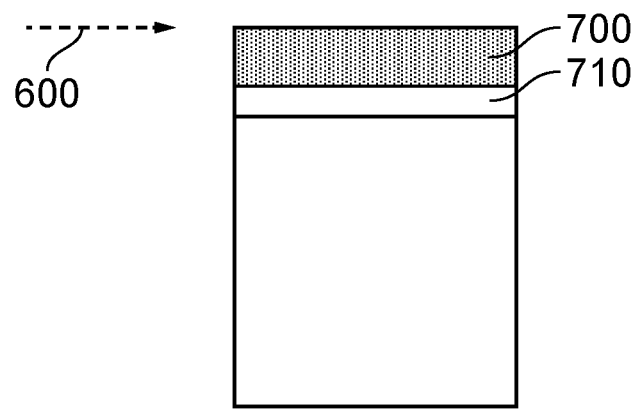

FIGS. 6 and 7 schematically illustrate some options for storing capability access permissions data with respect to the address 600 indicated by the control flow change operation (for example, a branch target address) as the control flow change target address. In FIG. 6 the address 600 indicates the location of the first instruction 610 to be executed after the control flow change operation, with the capability access permissions data 620 (shown shaded in FIGS. 6 and 7) being stored immediately preceding the address 600. For example, if the capability access permissions data 620 is 32 bits long, it would be stored in the 32 bits of memory immediately preceding the address 600.

Therefore, in the example of FIG. 6, the one or more instructions for execution after the control flow change operation include at least an instruction at the control flow change target address In FIG. 7, the capability access permissions data 700 is stored at the address 600, with the first instruction 710 to be executed after the control flow change operation (an instruction 710) immediately following the stored capability access permissions data 700. Again, in an example in which the capability access permissions data 620 is 32 bits long, the first instruction 710 would be stored at an address 32 bits after the address 700.

Therefore, in the example of FIG. 7, the control flow change handling circuitry is configured to determine the address at which capability access permissions data is stored as a memory address at the control flow change target address.

Control Flow Change Handling

Figure 8:
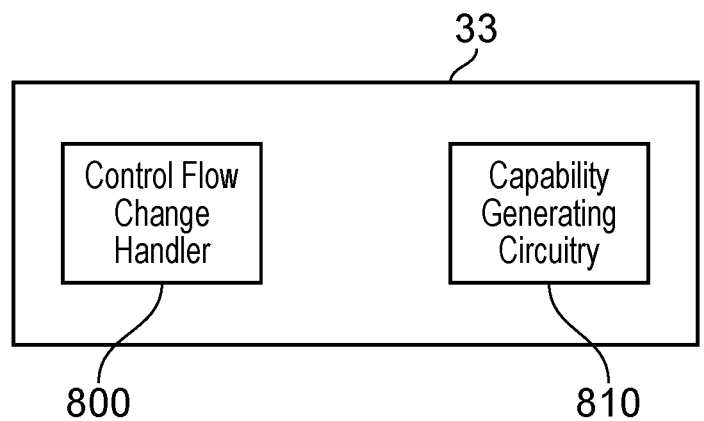
FIG. 8 provides a schematic overview of control flow change handling circuitry.

FIG. 8 provides a schematic overview of control flow change handling circuitry 33 as mentioned in FIG. 1, which comprises a control flow change handler 800 and capability generating circuitry 810.

Figure 9:
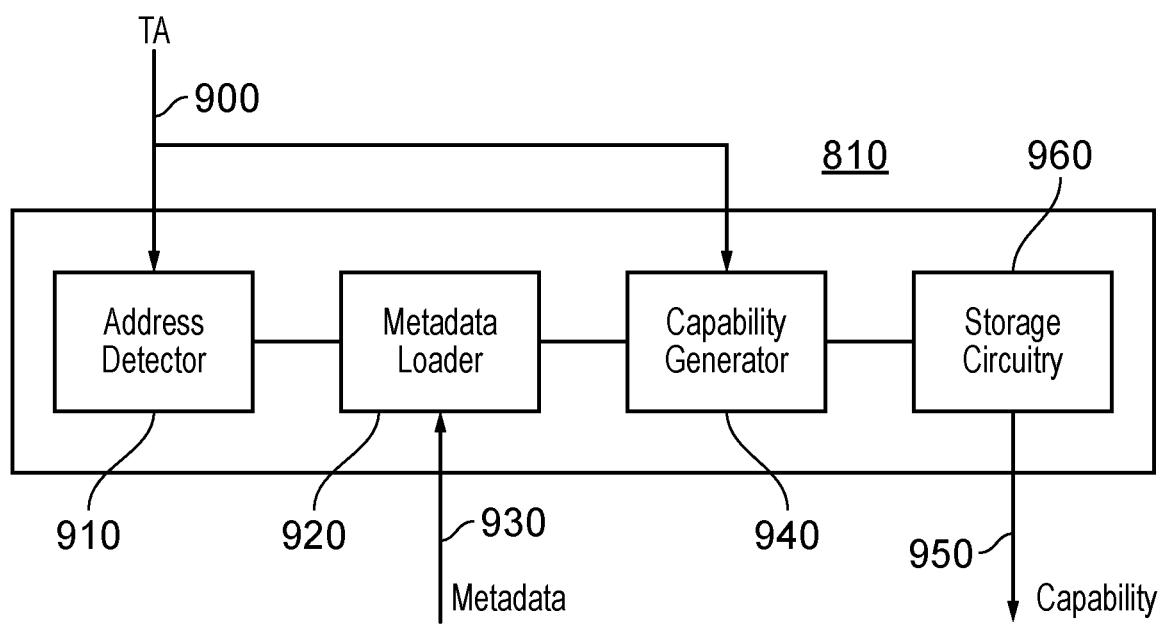
FIG. 9 schematically illustrates an example of capability generating circuitry.

Referring to FIG. 9, which schematically illustrates an example of the capability generating circuitry 810 of FIG. 8, a control flow change target address 900 (such as a branch target address) is detected by an address detector 910, and in response to this the address detector 910 determines the location of the capability access permissions data (capability metadata). This determination may be as simple as "an address equal to the control flow change target address" in the example of FIG. 7, or may be "an address offset by a predetermined difference from the address 900" in the example of FIG. 6, for example "address 900 minus 32 bits".

In response to the determination of the address of the metadata, a metadata loader 920 loads the capability access permissions data 930. A capability generator 940 generates a capability. Examples of this operation will be described below with reference to FIGS. 10 and 11 but in some examples, the capability generator 940 may concatenate the loaded metadata 930 and the target address 900, optionally with a tag, to produce a valid capability which is stored as a capability 950 by storage circuitry 960. For example, the storage circuitry 960 may store the generated capability 960 to the PCC 80. The generated capability 950 is provided for use as a next prevailing capability, for example to constrain processing of one or more instructions for execution after the control flow change operation.

Capability Generation

Figure 10:
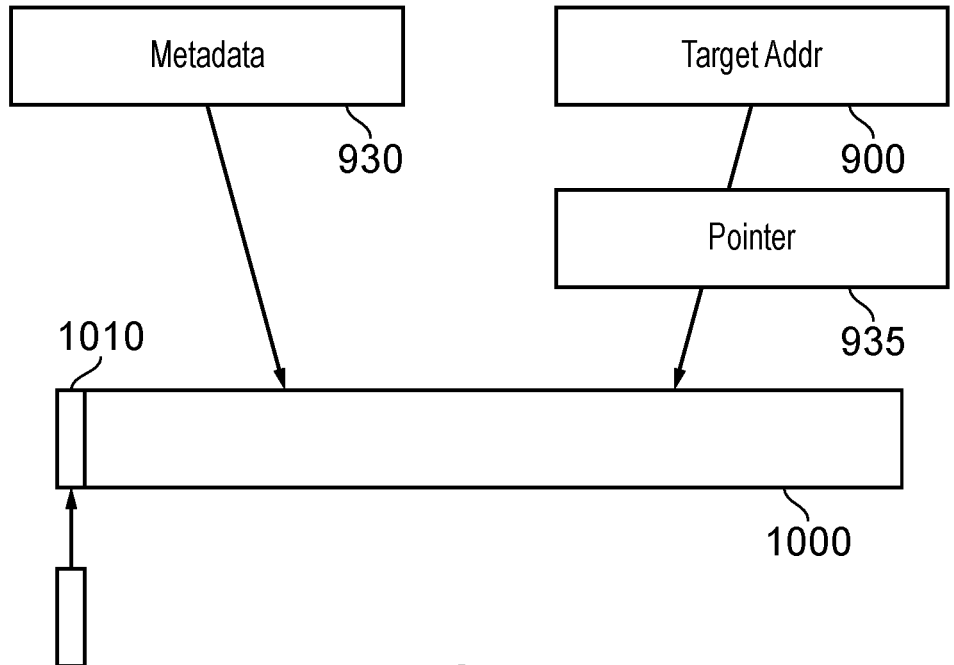
FIGS. 10 and 11 schematically illustrate respective examples for the generation of a capability.

Referring to FIG. 10, a capability 1000 is constructed by the capability generator 940 as a concatenation of the metadata 930 and a pointer 935 derived from the target address 900. A tag bit 1010 to indicate that this is a valid capability may be added by the capability generation circuitry 940 (noting that tag bits are allowed to be stored under the control of hardware responsive to valid instructions).

Figure 11:
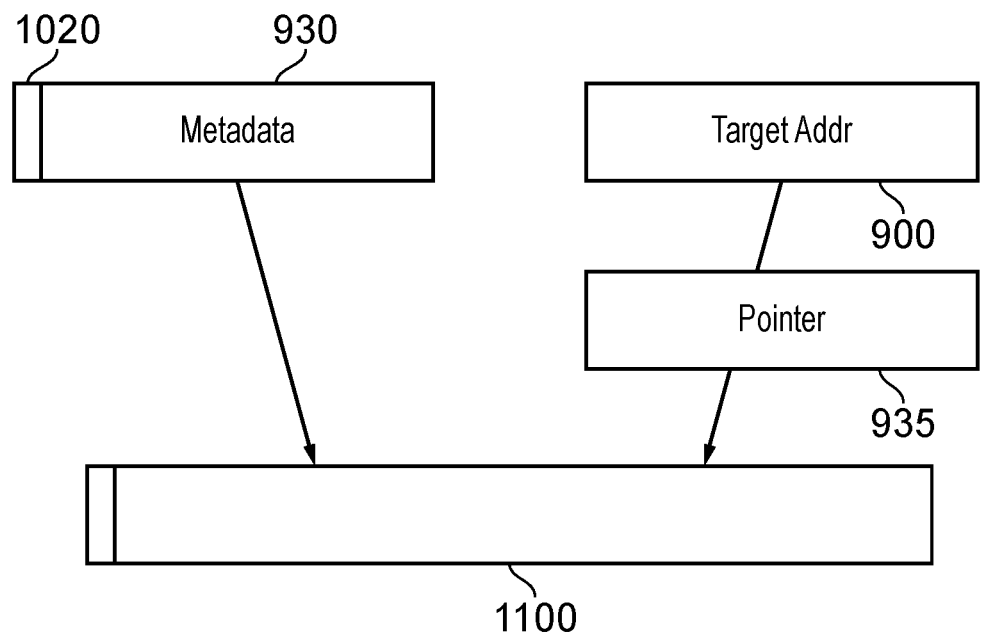

In FIG. 11, the metadata 930 includes a tag bit 1020 so that after the concatenation the resulting capability 1100 is stored including the tag bit.

Note that in either of the examples of FIGS. 10 and 11, the concatenation with a pointer derived from the control flow change target address 900 implies that the capability access permissions data can be smaller than a regular capability, needing only to provide that part of a capability not represented by the pointer portion itself. In the present example, this implies that the capability access permissions data can be only 32 (or 33) bits rather than the full size of a capability which (in this example) is 65 bits. Therefore, there is a potential saving in storage using this technique. Since the capability metadata 930 may only be stored once per code portion 520, there may be additional savings in storage space if the code portion is called from multiple locations, for example 500 and 510 in FIG. 5.

Therefore, in these examples, each capability comprises at least a pointer and data defining access permissions to the set of memory addresses; and the capability generating circuitry is configured to generate the pointer in dependence upon the control flow change target address and to generate the data defining access permissions to the set of memory addresses in dependence upon the capability access permissions data.

In some examples, the capability access permissions data defines one or more of (i) a lower limit memory address of an address region comprising the one or more memory addresses to which access is permitted, (ii) an upper limit memory address of the address region and (iii) a set of permission attributes applicable to the address region. Note however that in other examples the capability access permissions data may instead define a location at which information defining access permissions to the set of memory addresses is stored.

Timing Relating to the Generation of the Next Prevailing Capability

Figure 12:
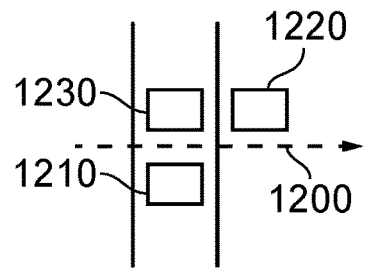
FIG. 12 is a schematic timeline illustrating one example of the generation of a capability.
Figure 13:
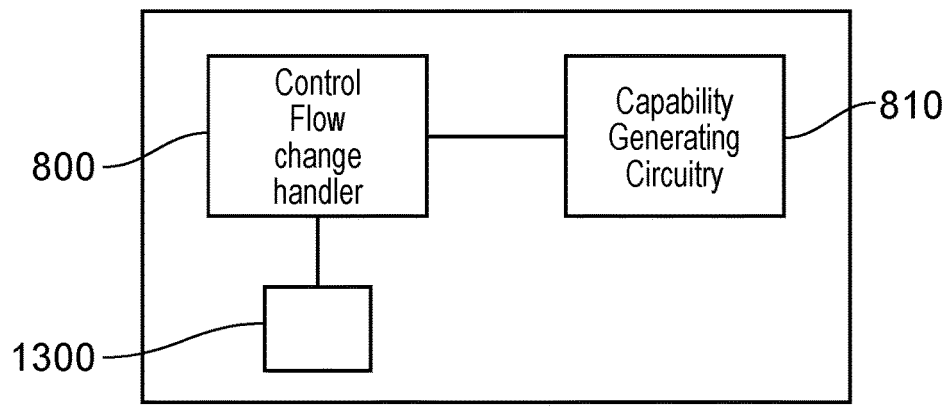
FIG. 13 provides a schematic overview of another example of control flow change handling circuitry.
Figure 14:
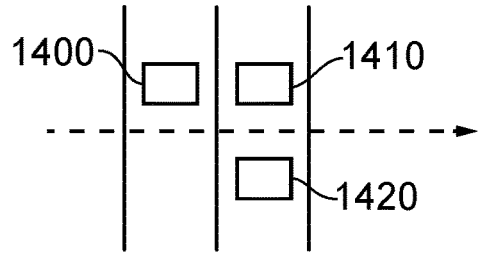
FIG. 14 is a schematic timeline illustrating another example of the generation of a capability.

FIGS. 12 to 14 concern timing considerations relating to the generation of the capability in the manner discussed above.

FIG. 12 is a schematic timeline from an architectural point of view (in which instruction execution is atomic, such that an instruction is viewed as either having been executed or not having been executed, and boundaries between instructions being indicated schematically by vertical lines as drawn), with time running 1200 from left to right, illustrating one example of the generation of a capability from the capability access permissions data. It will be appreciated that common microarchitecture techniques such as pipelining and out of order execution (as discussed earlier) may change actual ordering of events, but such techniques will preserve the illusion of architectural ordering shown in FIG. 12.

A schematic block 1210 represents the processes performed to generate the next capability (for example to constrain processing of one or more instructions for execution after the control flow change operation), and a schematic box 1220 represents the actual processing of a first instruction after the control flow change operation. The control flow change operation itself is indicated by a schematic box 1230 on the timeline.

In the example of FIG. 12, the generation of the new capability is completed before it is required for processing of the first instruction after the control flow change operation, and so that instruction may be processed with regard to constraints defined by the newly generated capability.

Referring to FIG. 13, another option is schematically illustrated which allows the first instruction (or in other examples a predetermined number of first instructions) after the control flow change operation to be fetch and/or executed independently of constraint by a prevailing capability. In this example, the control flow change handling unit of FIG. 8 is supplemented by storage 1300 to store a status indicator, which may be generated by the control flow change handler 800, as discussed below.

In some examples, in response to the control flow change operation, the processor (for example the control flow change handler 800) is configured to set a status indicator, to indicate that the capability generating circuitry 810 is required to generate the capability for use as a next prevailing capability. In response to the status indicator being set, the processor is configured to fetch and/or execute at least the first instruction at the control flow change target address independently of constraint by a prevailing capability. Note that in some example embodiments, notwithstanding the use of this technique, such an instruction may still be executed within the constraints of the new capability, but the use of the status indicator can allow at least the instruction fetch of that instruction to go ahead in advance of the capability being available. Then, in response to a signal from the capability generating circuitry indicating that the next capability has been generated, the processor (for example, the control flow change handler 800) is configured to clear the status indicator to a state indicating that processing of program instructions is constrained by a prevailing capability.

FIG. 14 schematically illustrates another version of the timeline (again from an architectural point of view) of FIG. 12, but in this example, after initiation 1400 of the control flow change operation, execution 1410 of at least the first instruction can proceed (under the conditions defined by the status indicator 1300) in an overlapping manner with the generation 1420 of the new capability, that is to say the capability to constrain processing of one or more instructions for execution after the control flow change operation.

Exception Handling Example

Figure 15:
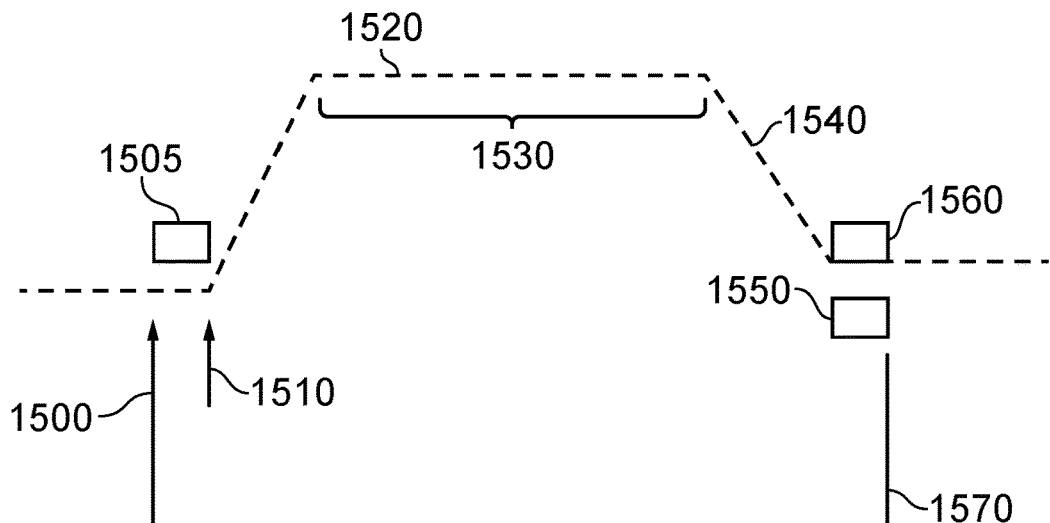
FIG. 15 schematically illustrates another example of control flow changes.

FIG. 15 schematically illustrates another example of control flow changes from an architectural point of view. Here, again time runs from left to right and a branch operation 1500 occurs at a time indicated by the respective arrow. The branch operation forms one example of a control flow change operation.

At a time indicated by an arrow 1510, a processor interrupt or other exception event takes place. This causes program flow to change, for example as shown by a vertical rise in a dotted line 1520 to an exception or interrupt handling routine 1530. This further program flow change occurs in the example of FIG. 15 before the execution of the first instruction after the original control flow change operation is performed. In order to achieve this, processor state information prior to the time 1510 is stored, for example by being pushed onto a processor stack. As regards the newly generated capability to constrain processing of one or more instructions for execution after the branch operation:

(a) in the case (similar to that of FIG. 12) in which the capability is generated before processing of the relevant instructions for execution after the branch operation, for example as an operation 1505, the newly generated capability may be stored and/or pushed to the stack or the like for retrieval and use on return 1540 from the exception event handling. In this case, the execution 1560 of the first instruction (in the same context/thread as the original control flow change operation) after the original control flow change operation is performed under constraints defined by that capability; or (b) in embodiments (similar to that of FIG. 14) using the status indicator 1300, this indicator is set in response to the operation 1505 and is also pushed to the stack, for example as part of the processor state information. On return 1540 from the interrupt handler, the processor state information is retrieved and both the generation 1550 of the new capability and the execution 1560 of the first instruction after the original control flow change operation are commenced.

The status flag may be cleared at a time 1570 at the end of the generation of the new capability and (in this example) the execution of the first instruction.

In these examples, the control flow change operation may also (or in other examples, instead) define a change of control flow to a processing exception handling routine and/or an exception return operation to return from processing an exception handling routine.

One example way of initiating a branch to an exception handling routine (corresponding to the stage 1510 in FIG. 15) is as follows. Each exception "type" has an associated number or index. Examples may include reset, system call exceptions, interrupt request, various types of fault and the like. Each exception type has an associated number (for example, between 0 and 15) which is generated by the exception handling circuitry 9 (FIG. 1) in response to external or internal conditions indicating an exception situation. In response to an exception event, the processor is configured to identify an entry in a "vector table" in memory in dependence on a number associated with the exception handling routine to be processed, wherein at least part of the entry is indicative of the control flow change target address. The control flow change handler 800 then controls a change of program flow, using the techniques discussed above, to that control flow change target address. As discussed above, this can involve saving prevailing processor status information, for example to a processor stack, for retrieval upon processing of an exception return operation. This can include as mentioned above storing the status indicator 1300 for retrieval upon processing of an exception return event.

In some examples, at least part of the entry in the vector table is indicative of whether the exception handling routine is to be processed independently of constraint by a prevailing capability. If this indication is set then (a) the processor acts upon the indication to execute the exception handling routine notwithstanding the prevailing capability, and optionally (b) the capability generating circuitry does not even attempt to generate a capability for use in respect of the exception handling routine.

Summary of Apparatus Features

Using techniques described in more detail above, FIG. 1 provides an example of apparatus comprising a processor to execute program instructions stored at respective memory addresses, processing of the program instructions being constrained by a prevailing capability defining at least access permissions to a set of one or more memory addresses; the processor comprising: control flow change handling circuitry 33 to perform a control flow change operation, the control flow change operation defining a control flow change target address indicating the address of a program instruction for execution after the control flow change operation; and capability generating circuitry 810 to determine, in dependence on the control flow change target address, an address at which capability access permissions data is stored; the capability generating circuitry being configured to retrieve the capability access permissions data and to generate a capability for use as a next prevailing capability in dependence upon at least the capability access permissions data. In examples, the capability for use as next prevailing capability is configured to constrain processing of one or more instructions for execution after the control flow change operation.

Summary Method

Figure 16:
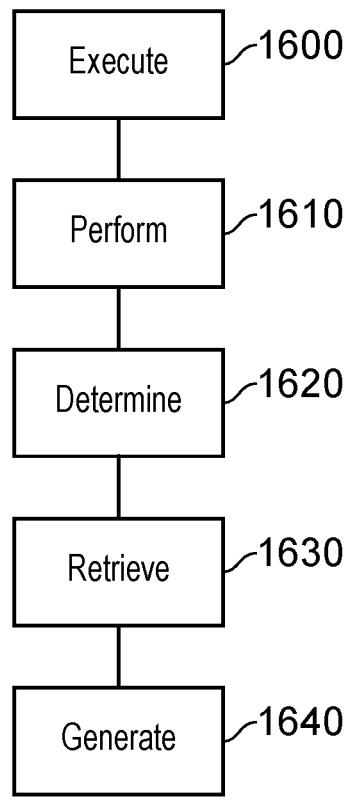
FIG. 16 is a schematic flowchart illustrating a method.

FIG. 16 is a schematic flowchart illustrating an example method comprising:

executing (at a step 1600) program instructions stored at respective memory addresses, processing of the program instructions being constrained by a prevailing capability defining at least access permissions to a set of one or more memory addresses;

performing (at a step 1610) a control flow change operation, the control flow change operation defining a control flow change target address indicating the address of a program instruction for execution after the control flow change operation;

determining (at a step 1620), in dependence on the control flow change target address, an address at which capability access permissions data is stored;

retrieving (at a step 1630) the capability access permissions data; and generating (at a step 1640) a capability for use as a next prevailing capability in dependence upon at least the capability access permissions data.

Example Simulator Implementation

Figure 17:
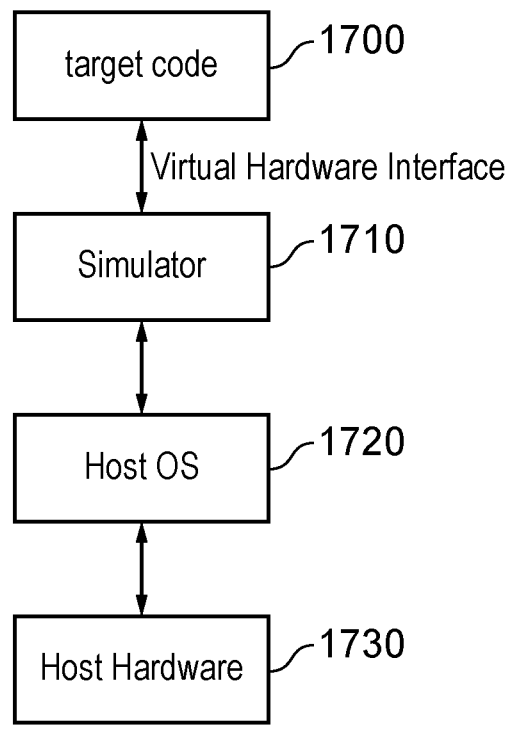
FIG. 17 schematically illustrates a simulator implementation.

FIG. 17 illustrates a simulator implementation that may be used to implement a simulation of the apparatus and/or methods discussed above.

Whilst the earlier described embodiments implement the present techniques in terms of apparatus and methods for operating specific processing hardware supporting the techniques concerned, it is also possible to provide an instruction execution environment in accordance with the embodiments described here which is implemented through the use of a computer program.

Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1730, optionally running a host operating system 1720, supporting the simulator program 1710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1730), some simulated embodiments may make use of the host hardware, where suitable.

The simulator program 1710 may be stored on a computer-readable storage medium (which may be a non-transitory medium), and provides a virtual hardware interface (instruction execution environment) to the target code 1700 (which may include applications, operating systems and a hypervisor) which is the same as the interface of the hardware architecture being modelled by the simulator program 1710. Thus, the program instructions of the target code 1700, including the functionality described above, may be executed from within the instruction execution environment using the simulator program 1710, so that a host computer 1730 which does not actually have the hardware features of the apparatus discussed above can emulate these features.

Such a computer program provides an example of a computer program for controlling a host data processing apparatus to provide an instruction execution environment comprising:

processor logic to execute program instructions stored at respective memory addresses, processing of the program instructions being constrained by a prevailing capability defining at least access permissions to a set of one or more memory addresses; the processor logic comprising:

control flow change handling logic to perform a control flow change operation, the control flow change operation defining a control flow change target address indicating the address of a program instruction for execution after the control flow change operation; and capability generating logic to determine, in dependence on the control flow change target address, an address at which capability access permissions data is stored;

the capability generating logic being configured to retrieve the capability access permissions data and to generate a capability for use as a next prevailing capability in dependence upon at least the capability access permissions data.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Apparatus comprising:
 a processor to execute program instructions stored at respective memory addresses, processing of the program instructions being constrained by a prevailing capability defining at least access permissions to a set of one or more memory addresses; the processor comprising:
  control flow change handling circuitry to perform a control flow change operation, the control flow change operation defining a control flow change target address indicating the address of a program instruction for execution after the control flow change operation; and
  capability generating circuitry to determine, in dependence on the control flow change target address, an address at which capability access permissions data is stored;
  the capability generating circuitry being configured to retrieve the capability access permissions data and to generate a capability for use as a next prevailing capability in dependence upon at least the capability access permissions data, and in which:
 each capability comprises at least a pointer and data defining access permissions to the set of memory addresses; and
 the capability generating circuitry is configured to generate the pointer in dependence upon the control flow change target address and to generate the data defining access permissions to the set of memory addresses in dependence upon the capability access permissions data.

2. The apparatus of claim 1, in which the capability for use as next prevailing capability is configured to constrain processing of one or more instructions for execution after the control flow change operation.

3. The apparatus of claim 1, in which the capability access permissions data defines one or more of (i) a lower limit memory address of an address region comprising the one or more memory addresses to which access is permitted, (ii) an upper limit memory address of the address region and (iii) a set of permission attributes applicable to the address region.

4. The apparatus of claim 1, in which the capability access permissions data defines a location at which information defining access permissions to the set of memory addresses is stored.

5. The apparatus of claim 1, in which in response to the control flow change operation the processor is configured to set a status indicator, to indicate that the capability generating circuitry is required to generate the capability for use as the next prevailing capability.

6. The apparatus of claim 5, in which, in response to the status indicator being set, the processor is configured to fetch and/or execute at least the first instruction at the control flow change target address independently of constraint by a prevailing capability.

7. The apparatus of claim 5, in which the processor is configured, in response to generation of the capability for use as the next prevailing capability, to clear the status indicator to a state indicating that processing of program instructions is constrained by a prevailing capability.

8. The apparatus of claim 1, in which the processor is configured, in response to a processing exception event to store the status indicator for retrieval upon processing of an exception return event.

9. The apparatus of claim 2, in which the one or more instructions for execution after the control flow change operation include at least an instruction at the control flow change target address.

10. The apparatus of claim 1, in which the control flow change handling circuitry is configured to determine the address at which capability access permissions data is stored as a memory address preceding the control flow change target address.

11. The apparatus of claim 1, in which the control flow change operation is one of:
    a branch operation in response to execution of a branch instruction; and
    a branch and link operation in response to execution of a branch and link instruction, the branch and link operation storing a return address capability, the return address capability being generated in dependence on the instruction address of the branch and link instruction, and the prevailing capability in use when the branch and link instruction was executed.

12. The apparatus of claim 11, in which the branch instruction comprises an operation code which defines at least the control flow change target address by a value indicative of a difference from an instruction address of the branch instruction.

13. The apparatus of claim 11, in which the branch instruction comprises an operation code which defines at least a register identifier that identifies a register containing a value indicative of the control flow change target address.

14. The apparatus of claim 1, in which the control flow change operation defines a change of control flow to a processing exception handling routine.

15. The apparatus of claim 14, in which the processor is configured to identify an entry in a vector table in memory in dependence on a number associated with the exception handling routine to be processed, wherein at least part of the entry is indicative of the control flow change target address.

16. The apparatus of claim 15, in which at least part of the entry is indicative of whether the exception handling routing is to be processed independently of constraint by a prevailing capability.

17. The apparatus of claim 1, in which the control flow change operation comprises an exception return operation to return from processing an exception handling routine.

18. A method comprising:
    executing program instructions stored at respective memory addresses, processing of the program instructions being constrained by a prevailing capability defining at least access permissions to a set of one or more memory addresses;
    performing a control flow change operation, the control flow change operation defining a control flow change target address indicating the address of a program instruction for execution after the control flow change operation;
    determining, in dependence on the control flow change target address, an address at which capability access permissions data is stored;
    retrieving the capability access permissions data; and
    generating a capability for use as a next prevailing capability in dependence upon at least the capability access permissions data, and in which:
    each capability comprises at least a pointer and data defining access permissions to the set of memory addresses; and
    the pointer is generated in dependence upon the control flow change target address and to generate the data defining access permissions to the set of memory addresses in dependence upon the capability access permissions data.

19. A computer program for controlling a host data processing apparatus to provide an instruction execution environment comprising:
    processor logic to execute program instructions stored at respective memory addresses, processing of the program instructions being constrained by a prevailing capability defining at least access permissions to a set of one or more memory addresses; the processor logic comprising:
    control flow change handling logic to perform a control flow change operation, the control flow change operation defining a control flow change target address indicating the address of a program instruction for execution after the control flow change operation; and
    capability generating logic to determine, in dependence on the control flow change target address, an address at which capability access permissions data is stored;
    the capability generating logic being configured to retrieve the capability access permissions data and to generate a capability for use as a next prevailing capability in dependence upon at least the capability access permissions data, and in which:
    each capability comprises at least a pointer and data defining access permissions to the set of memory addresses; and
    the pointer is generated in dependence upon the control flow change target address and to generate the data defining access permissions to the set of memory addresses in dependence upon the capability access permissions data.

* * * * *